US009759909B1

(12) United States Patent
Tauscher et al.

(10) Patent No.: US 9,759,909 B1
(45) Date of Patent: Sep. 12, 2017

(54) SCANNING PLATFORMS FOR SCANNING LASER DEVICES

(71) Applicant: Microvision, Inc., Redmond, WA (US)

(72) Inventors: Jason B. Tauscher, Sammamish, WA (US); Wyatt O. Davis, Bothell, WA (US); Dean R. Brown, Lynnwood, WA (US); David Roy Bowman, Mount Pleasant, SC (US); Roeland Collet, Olympia, WA (US); Mark P. Helsel, Seattle, WA (US); Gabriel Castro, Monroe, WA (US); Quinn William Haynie, Redmond, WA (US)

(73) Assignee: Microvision, Inc., Redmond, WA (US)

( * ) Notice: Subject to any disclaimer, the term of this patent is extended or adjusted under 35 U.S.C. 154(b) by 0 days.

(21) Appl. No.: 15/370,329

(22) Filed: Dec. 6, 2016

(51) Int. Cl.
    *G02B 26/08*     (2006.01)
    *G02B 26/10*     (2006.01)
    *H01S 3/00*     (2006.01)

(52) U.S. Cl.
    CPC ....... *G02B 26/085* (2013.01); *G02B 26/0841* (2013.01); *G02B 26/10* (2013.01); *H01S 3/0071* (2013.01)

(58) Field of Classification Search
    CPC .............. G02B 26/085; G02B 26/0833; G02B 26/0841; G02B 26/10; G02B 26/105; H01S 3/0071

USPC ......... 359/199.1–199.4, 200.6–200.8, 221.2, 359/224.1–224.2
See application file for complete search history.

(56) References Cited

U.S. PATENT DOCUMENTS

| | | | | |
|---|---|---|---|---|
| 5,428,473 A | * | 6/1995 | Takizawa | G11B 7/08564 310/75 R |
| 2014/0185117 A1 | * | 7/2014 | Hino | G02B 26/101 359/199.3 |

OTHER PUBLICATIONS

Milanovic, "Gimbal-Less Monolithic Silicon Actuators for Tip-Tilt-Piston Micromirror Applications", IEEE Journal in Quantum Electronics, vol. 10, No. 3, May/Jun. 2004.

* cited by examiner

*Primary Examiner* — James Phan
(74) *Attorney, Agent, or Firm* — Kevin D. Wills (57) ABSTRACT

Scanning platforms for use in scanning laser devices are described herein. These scanning platforms are particularly applicable to scanning laser devices that use microelectromechanical system (MEMS) structures to facilitate mirror motion. The scanning platforms include a centrally located stationary mount portion and a movable portion that surrounds the stationary portion. The movable portion is configured to be coupled to a mirror and to facilitate motion of that mirror. Such a scanning platform can facilitate reduced size in scanning mirror assembly, and thus can facilitate a more compact scanning laser device.

22 Claims, 6 Drawing Sheets

SCANNING PLATFORMS FOR SCANNING LASER DEVICES

FIELD

The present disclosure generally relates to scanning laser devices, and more particularly relates to scanning platforms used in scanning laser devices.

BACKGROUND

In scanning laser devices, laser light is reflected off one or more scanning mirrors. Scanning laser projectors and laser depth scanners are two examples of scanning laser devices. In scanning laser projectors, images are projected by scanning laser light into a pattern with a scanning mirror, with individual pixels generated by modulating the laser light. Similarly, laser depth scanners generate depth maps by scanning laser light into a pattern with a scanning mirror and measuring depth based on the reflections of the laser light.

One benefit of scanning laser devices is their compact size in both scanning laser projectors and laser depth scanners. One limiting factor in the size of current laser scanning devices is the size of the scanning mirror assemblies that hold and power the scanning mirror. In many cases the size of the scanning mirror assemblies is relatively large compared to the scanning mirror itself. This can be especially problematic for applications that require a relatively large scanning mirror and small overall device size.

Thus, there is a need for scanning mirror assemblies with reduced overall size relative to the size of the scanning mirror itself. Stated another way, there is a need for scanning mirror assemblies that can use a relatively large scanning mirror while being implemented in a relatively small device.

DESCRIPTION OF EMBODIMENTS

The embodiments described herein provide improved scanning platforms and mirror assemblies for use scanning laser devices, including scanning laser projectors, laser depth scanners, LIDAR systems, 3D motion sensing devices, gesture recognition devices, etc. Examples of such scanning laser projectors include traditional image projectors, head-up displays (HUD), and helmet mounted displays (HMD). These embodiments are particularly applicable to scanning laser devices that use microelectromechanical system (MEMS) scanning platforms to facilitate mirror motion. In such devices, the embodiments facilitate the use of a scanning mirror assembly with reduced size, and thus can facilitate a more compact scanning laser device.

In general, this is accomplished using a "frameless" scanning platform with an attached scanning mirror. Such a frameless scanning platform does not require a relatively large outer frame in the area surrounding the mirror. So configured, a frameless scanning platform can facilitate the use of a scanning mirror that is relatively large as compared to the scanning platform to which the mirror is attached. This in turn can facilitate a relatively compact scanning laser scanner assembly and associated scanning laser devices. In accordance with the embodiments described herein, this frameless scanning platform can be achieved using a stationary mount in the central portion of the scanning platform, and a movable portion of the scanning platform substantially surrounding stationary mount. So configured, a mirror can be affixed to movable portion, and such a mirror can be relatively large compared to the scanning platform.

Figure 1:
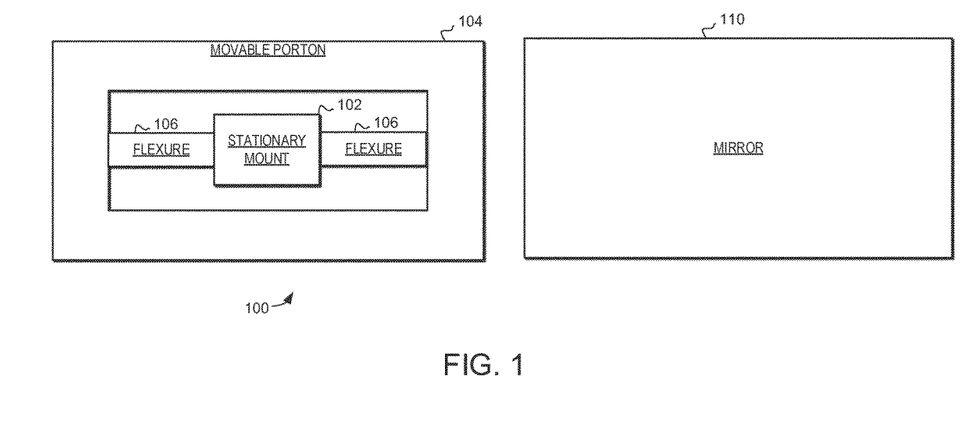
FIG. 1 shows a schematic diagram of a scanning platform in accordance with various embodiments of the present invention.

Turning now to FIG. 1, an exemplary scanning platform 100 is illustrated schematically. In general, the scanning platform 100 is provided to moveably couple a mirror to a die carrier in a laser scanning device. Specifically, the scanning platform 100 facilitates the motion off an attached mirror to facilitate laser scanning. In the embodiment of FIG. 1, the scanning platform 100 includes a stationary mount portion 102, a movable portion 104, and at least one flexure 106. Also illustrated in FIG. 1 is a mirror 110, although the mirror 110 is illustrated separately, and not shown attached to the scanning platform 100.

The stationary mount portion 102 is located in a central portion of the scanning platform 100. This stationary mount portion 102 is configured to couple to the die carrier of the MEMS mirror assembly. The movable portion 104 substantially surrounds the stationary mount portion 102 and is configured to couple to the mirror 110.

Additionally, the movable portion 104 includes a coil trace (not shown in FIG. 1). The flexures 106 are located on opposing sides of the stationary mount portion 102 and extending outwardly from the stationary mount portion 102 to the movable portion 104. So configured, the flexures 106 flexibly couple the stationary mount portion 102 to the movable portion 104 to facilitate movement of the movable portion 104 with respect to the stationary mount portion 102. Specifically, the flexures 106 facilitate movement of the movable portion 104 and the attached mirror 110 in response to electromagnetic interactions between the coil trace of the movable portion 104 and an applied electromagnetic field. It should be noted that while FIG. 1 illustrates two flexures, that in other embodiments only one flexure may be used, while in other embodiments more flexures may be used. In one example embodiment, the flexures 106 are implemented with torsion beams.

As was noted above, the embodiments described herein can provide for the use of a relatively large mirror 110 compared to the overall size of the scanning platform 100. For example, where the scanning platform 100 has a width and a length and the mirror 110 has a width and a length, the mirror 110 can be sized such that at least one of the scanning platform width and the scanning platform length is substantially equal to or less than the corresponding mirror width and mirror length. In the example of FIG. 1, both the width and the length of the mirror 110 are as large as the corresponding dimensions on the movable portion 104 to which the mirror 110 would be attached. Furthermore, the scanning platform 100 is implemented without a stationary outer frame that surrounds the movable portion 104. Together this facilitates the use of the mirror 110 that is nearly as large or nearly as large as the scanning platform 100.

In a typical implementation the scanning platform 100 would be fabricated from a single common substrate using MEMS techniques, including photolithography and micromachining. Thus, the stationary mount portion 102, the movable portion 104, and the two flexures 106 would each be formed from the same substrate using MEMS techniques.

For example, the scanning platform 100 can be photolithographically formed from single-crystal silicon. However, use of polycrystalline silicon or combination of single and polycrystalline silicon can also be used to achieve the desired structures. In yet other embodiments other materials such as gallium arsenide (GaAs) or silicon carbide (SiC) can be used.

In such techniques, multiple scanning platforms 100 can be patterned from a single wafer using a variety of photolithographic techniques, and then the individual scanning platforms can be separated and removed. These techniques can also include the deposition and patterning of metallization to form the conductive traces around the movable portion 104 and other electrical elements. When so fabricated, the mirror 110 can be separately formed and then coupled to the scanning platform 100 using any suitable technique. For example, the mirror 110 can be separately formed on the same silicon wafer as the scanning platform 100, and then attached to the scanning platform 100. Alternatively, the mirror 110 can be formed from different materials and with different techniques and then attached. For example, the mirror can be separately formed of metallic materials using precision micro-machining techniques.

As noted above, in a completed scanning laser device the mirror 110 would be coupled to the movable portion 104. In one embodiment, attachment structures are used to couple the mirror 110 to the movable portion 104. In such an embodiment, the attachment structures can be implemented as part of the mirror 110, as part of the movable portion 104, or as separate devices. These attachment structures can further serve to offset the mirror 110 from the scanning platform 100, and in particular from the stationary portion 102. This offset of the mirror 110 facilitates movement of the mirror 110 without impacting the stationary mount 102. Such an embodiment will be described in greater detail below.

As was mentioned above, the scanning platform 100 can be implemented with the mirror 110 for use in scanning laser devices, including scanning laser projectors and laser depth scanners. In such an embodiment the scanning laser device can be implemented with a drive circuit configured to provide drive signals to the coil trace on the movable portion 104. In the presence of an applied magnetic field, those drive signals excite motion of the movable portion 104 and the mirror 110 coupled to movable portion 104. The resulting motion of the mirror 110 reflects laser light into a pattern of scan lines, and thus can facilitate image projection and/or depth sensing.

In one specific embodiment that will be described in greater detail below, the scanning platform 100 is implemented in a scanning laser device that uses two mirrors for laser scanning. In such a device a first mirror can be configured to deflect along one axis and a second mirror configured to deflect along a second axis that is largely perpendicular to the first axis. Furthermore, in such a device the first mirror can be used for relatively fast scan motion, while the second mirror is used for relatively slow scan motion. In one specific embodiment, the relatively fast scan motion comprises resonant sinusoidal motion while the relatively slow scan motion comprises non-resonant quazistatic controlled motion.

The scanning platform 100 and the mirror 110 are particularly well adapted to providing slow scan motion in a two mirror scanning laser device. Specifically, because the scanning platform 100 can facilitate relatively large mirror size, the scanning platform 100 can provide reflection of a laser beam over a relatively large area and can thus facilitate the additional scanning of a laser beam that has already reflected off a fast scanning mirror. To implement this, the scanning platform 100 and associated devices can be implemented to generate relatively slow, non-resonant, controlled velocity and position. Again, examples of such an implementation will be described in greater detail below.

Figure 2A:
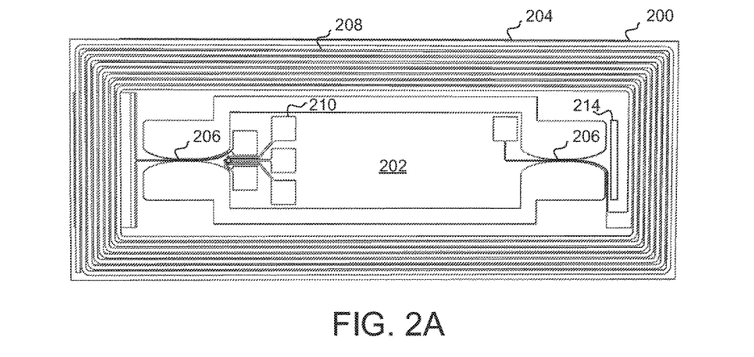
FIGS. 2A, 2B, and 2C shows top, side and back views of a scanning platform and mirror in accordance with an embodiment of the present invention.
Figure 2B:
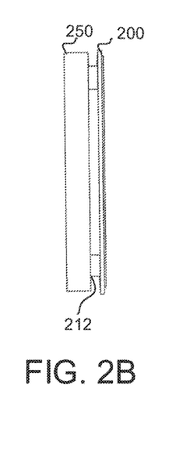
Figure 2C:
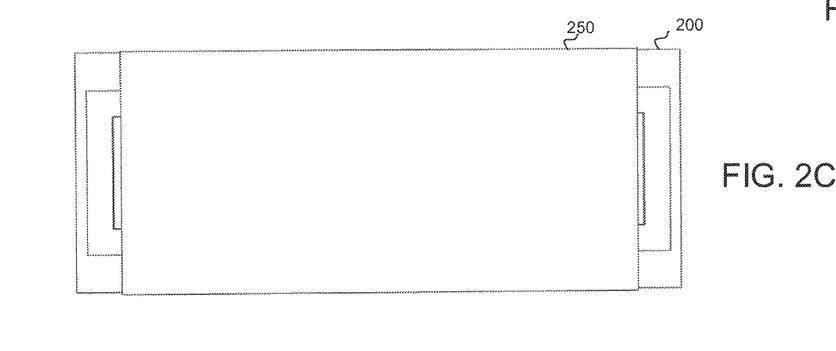

Turning now to FIGS. 2A, 2B, and 2C, front, back and side views of an exemplary scanning platform 200 and mirror 250 are illustrated. The scanning platform 200 includes a stationary mount portion 202, a movable portion 204, two flexures 206, coil traces 208, contacts 210 and attachment structures 212. As with the example of FIG. 1, the scanning platform 200 facilitates the motion off the attached mirror 250 to facilitate scanning in a laser scanning device.

The stationary mount portion 202 is located in a central portion of the scanning platform 200. The stationary mount portion 202 is configured to be mounted to a die carrier in a scanner assembly (not shown in FIG. 2) or other suitable device. The movable portion 204 substantially surrounds the stationary mount portion 202 and is coupled to the mirror 250 through attachment structures 212. In this illustrated embodiment, these attachment structures 212 serve to offset the mirror 250 away from the scanning platform 200. This offset of the mirror 250 away from the scanning platform 200 allows the mirror 250 to rotate with a defined angle range without impacting the stationary mount 202.

The movable portion 204 includes the coil traces 208 while the stationary mount portion 202 includes various contacts 210. The coil traces 208 are configured to interact with applied magnetic fields and generate motion. In this illustrated example the coil traces 208 circumscribes the stationary mount portion 202 so that the stationary mount portion 202 is located substantially in the center of the coil traces 208. However, this is just one example. As other examples, separate and independent coil traces on either side of the stationary mount portion 202 can be used. In yet other examples, coil traces can be formed on the attachment structures 212.

The contacts 210 provide electrical connection between the scanning platform 200 and the attached die carrier. Specifically, the contacts 210 provide electrical connection to the coil traces 208 and the attached die carrier. Notably, this connection can be provided through metallic traces on the two flexures 206. Additionally, the contacts 210 can provide electrical connection to other elements such as sensors.

The two flexures 206 are located on opposing sides of the stationary mount portion 202 and extend outwardly from the stationary mount portion 202 to the movable portion 204. So configured, the two flexures 206 flexibly couple the stationary mount portion 202 to the movable portion 204 to facilitate movement of the movable portion 204 with respect to the stationary mount portion 202. Specifically, the two flexures 206 allow the movable portion 204 and the mirror 250 to rotate about a central axis. This rotation of the mirror 250 facilitates the use of the mirror 250 to reflect a laser beam into a scan pattern.

In this illustrated embodiment, a slot 214 is formed proximate to the one of the two flexures 206. So implemented, this slot 214 can provide stress relief in the structure of the scanning platform 200. It should be noted that this is just one example of the type of openings and other structures that can be formed in the scanning platform 200 for stress relief. For example, in other embodiments openings can be formed proximate to both flexures 206. In other examples, stress relief can be provided with any collection of geometries needed to balance stress relief and other performance requirements.

During operation, a drive circuit (not shown in FIG. 2) provides drive signals to the coil trace 208 through contacts 210. Those drive signals create electromagnetic interactions between the coil trace 208 and an applied magnetic field, and those interactions excite motion of the movable portion 204 and the attached mirror 250. Again, this resulting motion of the mirror 250 can be configured to reflect laser light into a pattern of scan lines, and thus can facilitate laser image projection and/or laser depth sensing.

In some embodiments the scanning platform 200 may also incorporate one or sensors. For example, the scanning platform 200 may also include one or more integrated piezoresistive position sensors. These piezoresistive sensors can be configured to produces a voltage that represents the displacement of movable portion 204 and mirror 250 with respect to the stationary portion 202, and this voltage can be provided as feedback to the drive circuit.

The scanning platform 200 can be fabricated from a single common substrate using MEMS techniques. Thus, the stationary mount portion 202, the movable portion 204 and the two flexures 206 can all be formed from the same substrate. Additionally, in some embodiments the attachment structures 212 can also be formed from the same substrate, while in other embodiments the attachment structures are 212 are formed separately or as part of the mirror 250. The coil traces 208 and contacts 210 can be formed with any suitable MEMS technique. For example, the coil traces 208 and contacts 210 can be formed by the selective deposition and patterning of conductive materials on the substrate.

Again, the scanning platform 200 and attached mirror 250 can be implemented in variety of scanning laser devices, including scanning laser projectors and laser depth scanners. For example, the scanning platform 200 can be implemented as part of a scanning laser device to provide relatively slow scan motion while relatively fast scan motion is provided by another mirror. In such a device, the relatively large size of the mirror 250 compared to the overall size of the scanning platform 200 facilitates the use of the mirror 250 for slow scanning while providing a relatively compact overall device size.

Figure 3A:
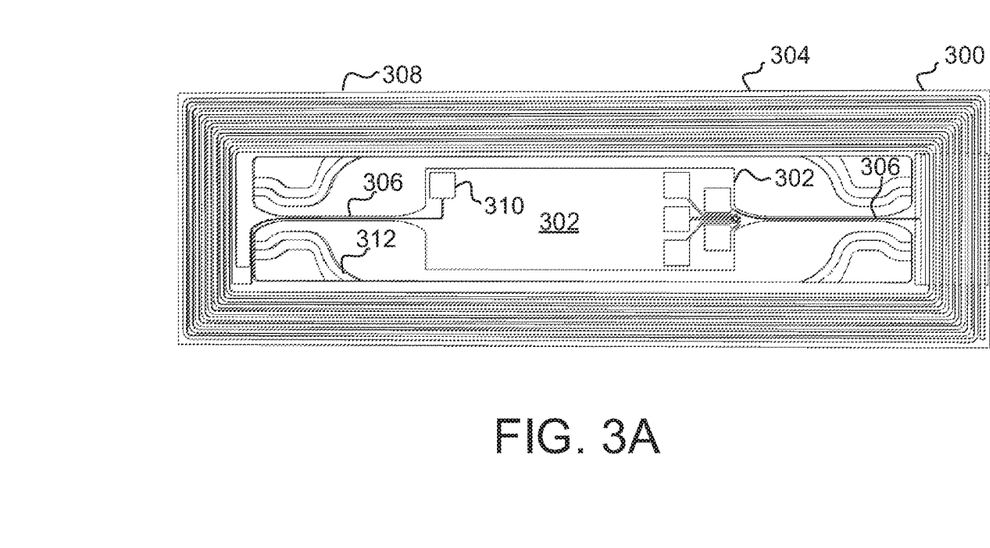
FIGS. 3A, 3B, and 3C shows top, side and back views of a scanning platform and mirror in accordance with an embodiment of the present invention.
Figure 3B:
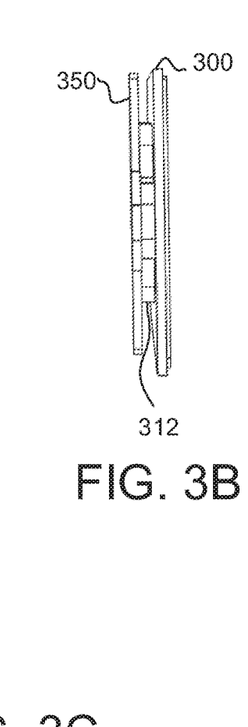
Figure 3C:
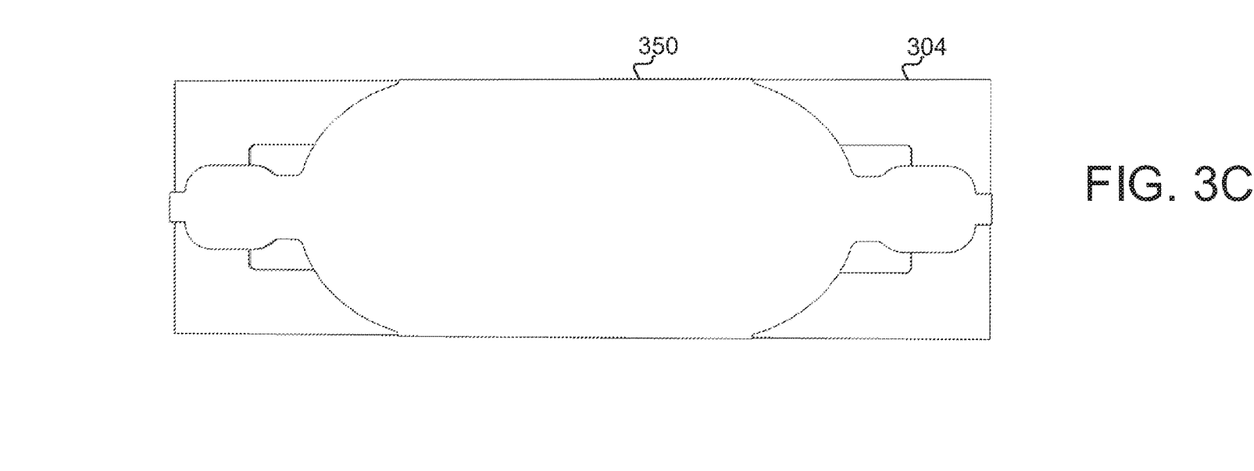

Turning now to FIGS. 3A, 3B, and 3C, front, back and side views of another exemplary scanning platform 300 and attached mirror 350 are illustrated. In the embodiment of FIG. 3, the scanning platform 300 includes a stationary mount portion 302, a movable portion 304, two flexures 306, coil traces 308, and contacts 310.

The stationary mount portion 302 is again located in a central portion of the scanning platform 300, and is configured to be mounted to a die carrier in a MEMS scanner assembly (not shown in FIG. 3). The movable portion 304 substantially surrounds the stationary mount portion 202 and is coupled to the mirror 350 through attachment structures 312.

In this illustrated embodiment, the attachment structures 312 are formed integrally with mirror 350. Specifically, MEMS techniques can be used to form the mirror 350 and the attachment structures 312 from a unitary substrate. When formed together, the attachment structures 312 can provide additional stiffness to the reflective surface of the mirror 350. Additionally, the MEMS techniques allow the mirror 350 to be formed with circular shaped edges that match the radius of the scanned beam. This also allows to build a device with lower mass for a given mirror size and can thus provide improved performance, but at the design cost of added complexity.

Figure 4:
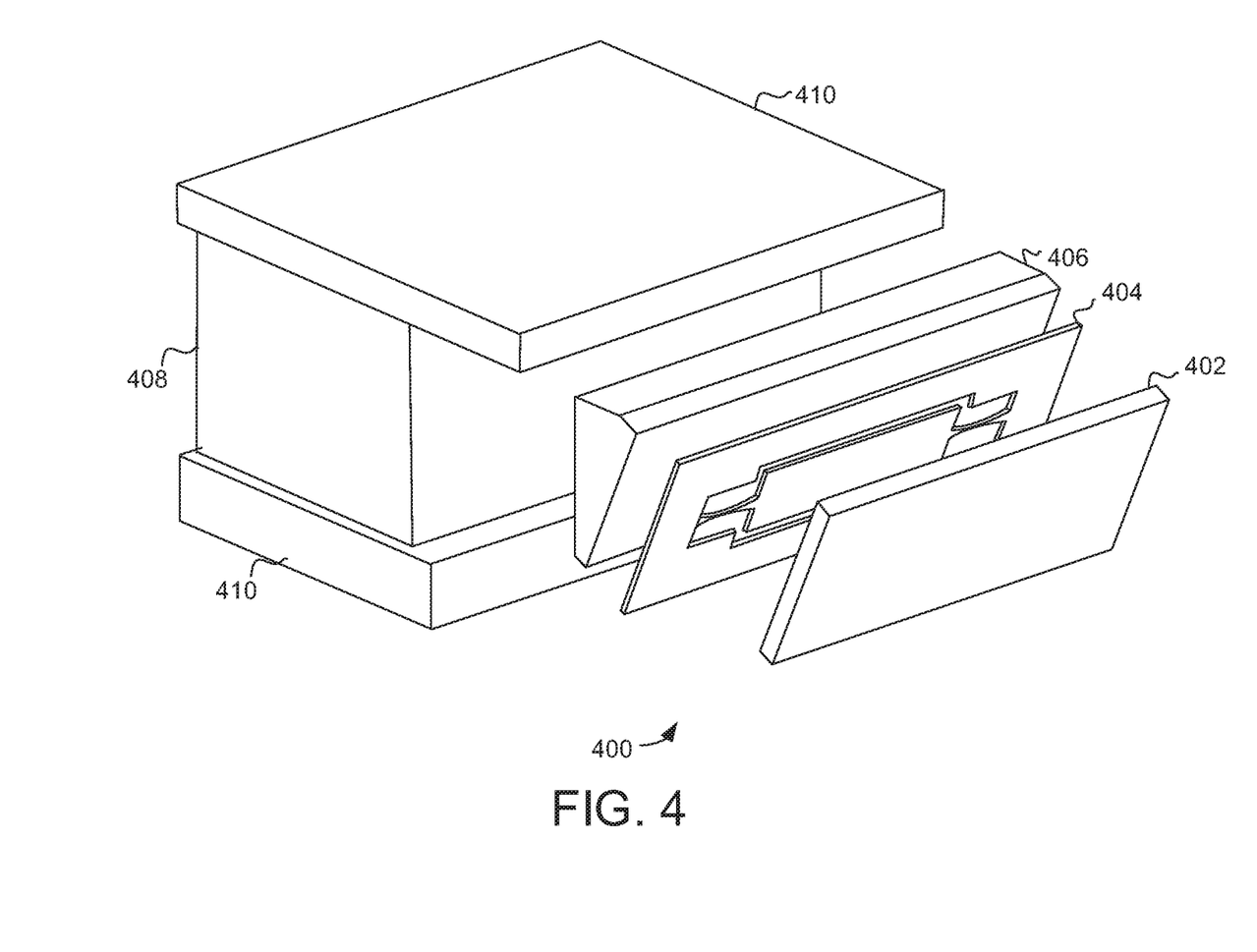
FIG. 4 shows a perspective view of a MEMS scanner assembly in accordance with various embodiments of the present invention.

Turning now to FIG. 4, a perspective view of a MEMS scanner assembly 400 is illustrated. The MEMS scanner assembly 400 is exemplary of the type that can be used in a MEMS laser scanner. The MEMS scanner assembly 400 includes a mirror 402, a scanning platform 404, a die carrier 406, a magnet 408, and keepers 410. The scanning platform 404 can be implemented in accordance in accordance with the various embodiments described herein (e.g., scanning platform 100, 200, 300, etc.). As described above, this facilitates a relatively compact device while providing the ability to use a relatively large mirror 402. Furthermore, it should be noted that MEMS scanner assembly 400 is just one example of the type of assembly that can be implemented to use the various scanning platforms described herein. For example, the MEMS scanner assembly 400 can have different configurations to facilitate different mirror aspect ratios.

As described above, the scanning platform 404 includes a stationary mount portion and a movable portion. The movable portion is configured to mount to the mirror 402, while the stationary mount portion is configured to be mounted to the die carrier 406. The die carrier 406 further provides the electrical connection to the scanning platform through appropriate conductors and contacts. These connections include connections to the coil traces on the scanning platform 404 such that a drive circuit can drive an appropriate signal onto the coil traces. The magnet 408 generates an electromagnetic field that interacts with the coil traces to generate motion of the mirror 402. Again, this motion of the mirror 402 can be configured to reflect laser light into a pattern of scan lines, and thus can facilitate image projection and/or depth sensing. Finally, the keepers 410 are provided to focus the electromagnetic field on the coil traces. When implemented, the keepers 410 can facilitate a compact overall size, and can improve power efficiency and maximize the device performance.

As one example, the MEMS scanner assembly 400 can be implemented in a scanning laser device to provide relatively slow scan motion while relatively fast scan motion is provided by another mirror. In such a device, the relatively large size of the mirror 402 compared to the overall size of the scanning platform 404 and MEMS scanner assembly 400 facilitates use for slow scanning while providing a relatively small compact size.

Figure 5:
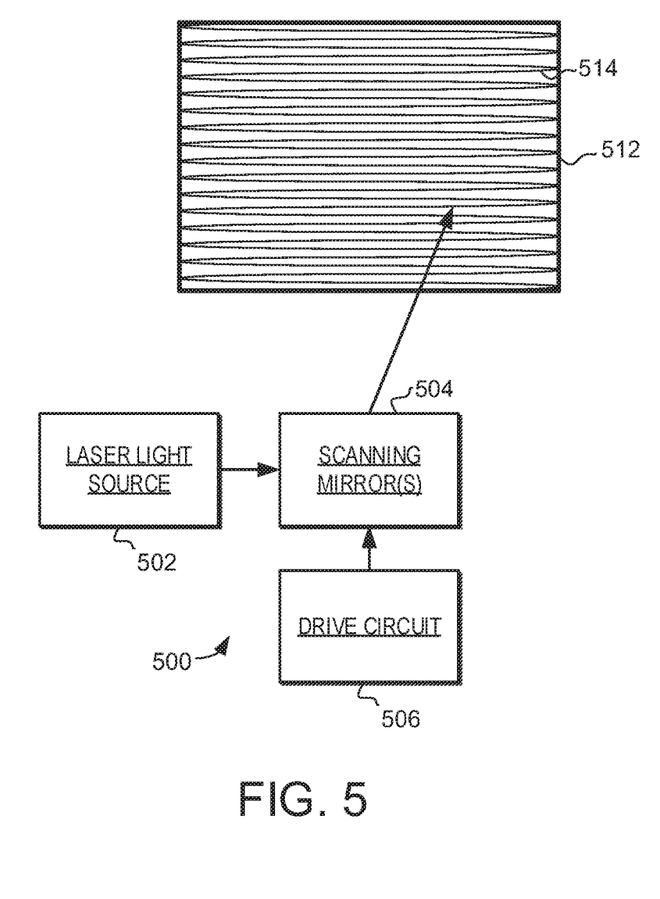
FIG. 5 shows a schematic view of a scanning laser device in accordance with various embodiments of the present invention.

Turning now to FIG. 5, a schematic diagram of a scanning laser device 500 is illustrated. The scanning laser device 500 includes a laser light source 502, scanning mirror(s) 504 and a drive circuit 506. During operation, the laser light source 502 generates at least one beam of laser light that is reflected by the scanning mirror(s) 504 into a pattern 514 of scan lines inside a scanning region 512. In the example of FIG. 5, the pattern 514 of scan lines comprises a raster pattern. However, this is just one example, and in other embodiments other patterns of scan lines can be generated and used. For example, spiral patterns and Lissajous patterns could instead be implemented.

To facilitate this, the drive circuit 506 controls the movement of the scanning mirror(s) 504. Specifically, the drive circuit 506 provides excitation signal(s) to excite motion of the scanning mirror(s) 504.

In accordance with the embodiments described herein, one or more of the scanning mirrors 504 is implemented with a scanning platform and mirror as described above (e.g., scanning platform 100, 200, 300, etc.). Such a scanning laser device 500 can be implemented to perform a variety of functions. For example, the scanning laser device 500 can be implemented to facilitate image projection, laser depth scanning LIDAR, 3D motion sensing, gesture recognition, etc.

As one example, in a device implemented to provide image projection, the beam of laser light would be encoded with pixel data to generate image pixels. In another example, the laser light source 502 can include an infrared or other suitable laser that is used to generate the depth mapping pulses. Reflections of these pulses from a surface can then be received and used to generate 3-dimensional maps of the surface. For example, the depth map of the surface can be determined by calculating a time of flight for the return of each received depth mapping pulse.

Figure 6:
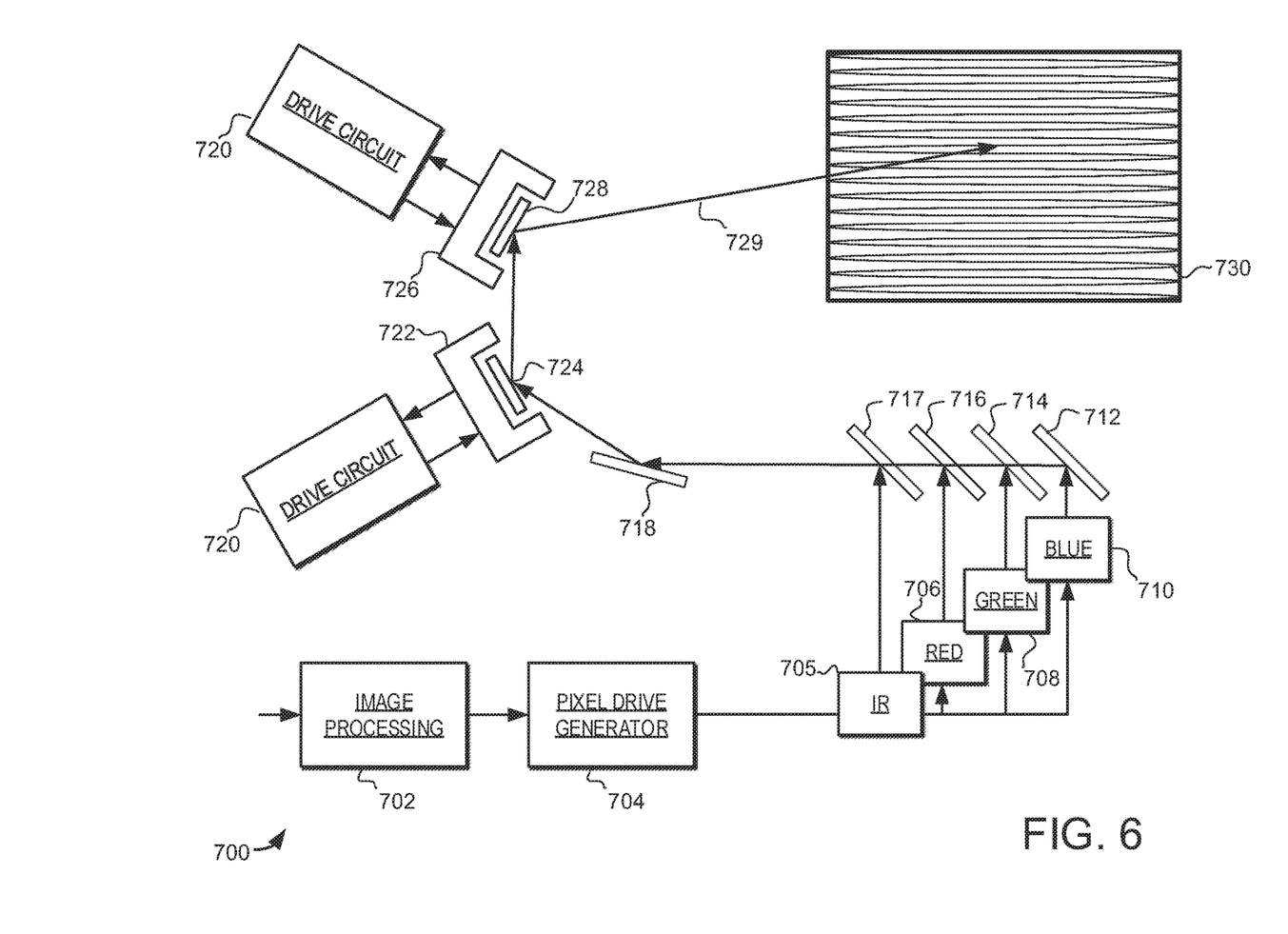
FIG. 6 shows a schematic view of a scanning laser projector in accordance with various embodiments of the present invention.

Turning now to FIG. 6, a schematic view of a scanning laser projector 700 is illustrated. The scanning laser projector 700 is a more detailed example of the type of system that can be used in accordance with various embodiments of the present invention. Specifically, the scanning laser projector 700 can be implemented using the various scanning platforms and mirrors described above. In some embodiments, the scanning laser projector is implemented to provide both laser depth scanning and laser image projection, while in other embodiments only image projection is provided.

Scanning laser projector 700 includes an image processing component 702, a pixel drive generator 704, an infrared laser module 705, a red laser module 706, a green laser module 708, and a blue laser module 710. In such an embodiment the red, green and blue light can be used for image projection, while the infrared light can be used for depth scanning. Light from the laser modules is combined with dichroics 712, 714, 716, and 717. Scanning laser projector 700 also includes fold mirror 718, drive circuits 720, a first MEMS scanner assembly 722 with first scanning mirror 724, and second MEMS scanner assembly 726 with a second scanning mirror 728. It should be noted that this illustrated arrangement for combing the outputs from the various laser modules is just one example implementation, and other implementations using different techniques for combing laser light of different wavelengths can instead be used.

In operation, image processing component 702 processes video content using two dimensional interpolation algorithms to determine the appropriate spatial image content for each scan position at which an output pixel is to be displayed by the pixel drive generator 704. For example, the video content may represent a grid of pixels at any resolution (e.g., 640×480, 848×480, 1280×720, and 1920×1080). The input light intensity encoding typically represents the light intensity in 8, 10, 12 bit or higher resolutions.

This content is then mapped to a commanded current for each of the red, green, and blue laser sources such that the output intensity from the lasers is consistent with the input image content. In some embodiments, this process occurs at output pixel rates in excess of 150 MHz. The laser beams are then directed onto scanning mirrors 724 and 728. In general, the first scanning mirror 724 provides for one axis of motion (e.g., horizontal), while the second scanning mirror 728 provides for another axis of motion (e.g., vertical). In a typical implementation of such an embodiment, the second scanning mirror 728 is operated to provide the vertical scanning motion at a relatively slow scan rate, while the first scanning mirror 724 is operated to provide horizontal motion at a relatively fast scan rate. This results in the output beam 729 generating a scanning pattern 730.

To provide such a system, the rotation of the second scanning mirror 728 can be operated quasi-statically to create a vertical sawtooth raster trajectory. Conversely, the rotation of the first scanning mirror 724 can be operated on a resonant vibrational mode of the first scanning mirror 724 to create sinusoidal motion. Together, this generates both horizontal and vertical motion of the laser beam and results in the pattern 514 of scan lines.

In these embodiments, output beam 729 sweeps back and forth left-to-right in a sinusoidal pattern, and sweeps vertically (top-to-bottom) in a sawtooth pattern with the display blanked during flyback (bottom-to-top). It should be noted that the illustrated scanning pattern 730 shows a sinusoidal pattern as the beam sweeps vertically top-to-bottom, but does not show the flyback from bottom-to-top.

In other embodiments, the vertical sweep is controlled with a triangular wave such that there is no flyback. In still further embodiments, the vertical sweep is sinusoidal. Finally, the various embodiments of the invention are not limited by the waveforms used to control the vertical and horizontal sweep or the resulting raster pattern 730.

It should be noted that in some embodiments, the first MEMS scanner assembly 722 and the second MEMS scanner assembly 726 both use electromagnetic actuation as described above with reference to FIG. 4. However, in other embodiments one more of the scanner assemblies can use other techniques, including electrostatic or piezoelectric actuation. Furthermore, any number of mirrors and type of mirror actuation may be employed without departing from the scope of the present invention.

The drive circuits 720 provide drive signals to mirror assemblies 722 and 726. The drive signals include excitation signals to control the motion of the scanning mirrors 724 and 728. In operation, the laser light sources produce light pulses for each output pixel and scanning mirrors 724 and 728 reflect the light pulses as the output beam 729 traverses the pattern 730. Drive circuits 720 can also receive feedback signals from MEMS mirror assemblies 722 and 726. The feedback signals can describe the driven deflection angles of the mirrors, and can be used by the drive circuit 720 to more accurately control the motion of the first scanning mirror 724.

For example, the drive circuit 720 can excite resonant motion of the first scanning mirror 724 such that the peak amplitude of the feedback signal is constant. This provides for a stable maximum angular deflection on the fast-scan axis as shown in raster pattern 730. The excitation signal used to excite resonant motion of the first scanning mirror 724 can include both amplitude and a phase. Drive circuit 720 includes feedback circuit(s) that modifies the excitation signal amplitude to keep the feedback signal peak amplitude substantially constant. Additionally, the drive circuit 720 can modify the excitation signal to control the horizontal phase alignment and vertical position of the raster pattern 730.

To facilitate this, drive circuit 720 may be implemented in hardware, a programmable processor, or in any combination. For example, in some embodiments, drive circuit 720 is implemented in an application specific integrated circuit (ASIC). Further, in some embodiments, some of the faster data path control is performed in an ASIC and overall control is provided by a software programmable microprocessor.

It should be noted that while FIG. 6 illustrates an embodiment with two drive circuits 720 and two MEMS mirror assemblies 722 and 726, that this is just one example implementation. As another example, a scanning laser projector could instead be implemented with fewer or more scanning mirror assemblies and mirrors.

Finally, although red, green, blue, and infrared laser light sources are shown in FIG. 6, the various embodiments are not limited to these exemplary wavelengths of laser light.

In one embodiment, a scanning platform for moveably coupling a mirror to a die carrier in a MEMS scanner assembly is provided. In this embodiment, the scanning platform comprises: a stationary mount portion located in a central portion of the scanning platform, the stationary mount portion configured to couple to the die carrier of the MEMS scanner assembly; a movable portion configured to couple to the mirror, the movable portion substantially surrounding the stationary mount portion and having a coil trace formed thereon; and at least one flexure flexibly coupling the stationary mount portion to the movable portion to thereby permit movement of the movable portion with respect to the stationary mount portion in response to electromagnetic interactions between the coil trace of the movable portion and an applied electromagnetic field.

In another embodiment, a MEMS scanner assembly is provided. In this embodiment, the MEMS scanner assembly comprises: a mirror; a die carrier, the die carrier including a first electrical connector; and a scanning platform having a first side facing toward the die carrier and an opposing second side facing toward the mirror, the scanning platform comprising: a stationary mount portion located in a central portion of the scanning platform, wherein the first side of the stationary mount is rigidly coupled to the die carrier of the MEMS scanner, the stationary mount portion including a second electrical connector coupled to the first electrical connector; a movable portion surrounding the stationary mount portion, the movable portion having a coil trace and being rigidly coupled to the mirror, the coil trace electrically coupled to the second electrical connector; and at least one flexure flexibly coupling the stationary mount portion to the movable portion to thereby permit movement of the of the movable portion and the mirror with respect to the stationary mount portion in response to electromagnetic interactions between the coil trace of the movable portion and an applied electromagnetic field.

In another embodiment, a scanning laser device is provided, comprising: at least one source of laser light, the at least one source of laser light configured to generate a laser beam; a first scanning mirror configured to reflect the laser beam; a scanning platform comprising; a stationary mount portion located in a central portion of the scanning platform, the stationary mount rigidly coupled to a die carrier; a movable portion rigidly coupled to the first scanning mirror, the movable portion surrounding the stationary mount portion and having a coil trace formed thereon; and at least one flexure flexibly coupling the stationary mount portion to the movable portion to thereby permit movement of the movable portion and the first scanning mirror with respect to the stationary mount portion in response to electromagnetic interactions between the coil trace of the movable portion and an applied electromagnetic field; and a drive circuit configured to provide a signal to the coil trace to excite motion of the first scanning mirror in the applied electromagnetic field in order to reflect the laser beam in a pattern of scan lines.

In the preceding detailed description, reference was made to the accompanying drawings that show, by way of illustration, specific embodiments in which the invention may be practiced. These embodiments were described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The preceding detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanning platform for moveably coupling a mirror to a die carrier in a microelectromechanical systems (MEMS) scanner assembly, the scanning platform comprising:
   a stationary mount portion located in a central portion of the scanning platform, the stationary mount portion configured to couple to the die carrier of the MEMS scanner assembly;
   a movable portion configured to couple to the mirror, the movable portion substantially surrounding the stationary mount portion and having a coil trace formed thereon; and
   at least one flexure flexibly coupling the stationary mount portion to the movable portion to thereby permit movement of the movable portion with respect to the stationary mount portion in response to electromagnetic interactions between the coil trace of the movable portion and an applied electromagnetic field.

2. The scanning platform of claim 1, wherein the scanning platform is formed without a stationary external frame surrounding the movable portion.

3. The scanning platform of claim 1, wherein the mirror is fixedly coupled to the movable portion via at least one mirror attachment structure.

4. The scanning platform of claim 3, wherein the stationary mount portion, the movable portion and the at least one flexure of the scanning platform are all formed on a common substrate using MEMS techniques, and wherein the mirror is formed separately from the scanning platform and attached to the scanning platform.

5. The scanning platform of claim 1, wherein the coil trace of the movable portion circumscribes the stationary mount portion so that the stationary mount portion is located in a center of the coil trace.

6. The scanning platform of claim 1, wherein the movable portion includes at least one opening proximate an intersection of the at least one flexure and the movable portion to relieve stress between the stationary portion and the movable portion.

7. The scanning platform of claim 1, wherein the at least one flexure comprises two flexures, wherein the two flexures are located on opposing sides of the stationary mount portion and extend outwardly from the stationary mount portion to the movable portion.

8. The scanning platform of claim 1, wherein the movable portion includes a first side and s second side opposite the first side, and wherein the coil trace is formed on the first side of the movable portion and where the second side of the movable portion is configured to couple to the mirror.

9. The scanning platform of claim 1, wherein the scanning platform has a width and a length, and wherein the mirror has a width and a length, and wherein at least one of the scanning platform width and scanning platform length is equal to or less than a corresponding one of the mirror width and the mirror length.

10. A microelectromechanical systems (MEMS) scanner assembly, comprising:
 a mirror;
 a die carrier, the die carrier including a first electrical connector; and
 a scanning platform having a first side facing toward the die carrier and an opposing second side facing toward the mirror, the scanning platform comprising:
  a stationary mount portion located in a central portion of the scanning platform, wherein the first side of the stationary mount is rigidly coupled to the die carrier of the MEMS scanner, the stationary mount portion including a second electrical connector coupled to the first electrical connector;
  a movable portion surrounding the stationary mount portion, the movable portion having a coil trace and being rigidly coupled to the mirror, the coil trace electrically coupled to the second electrical connector; and
  at least one flexure flexibly coupling the stationary mount portion to the movable portion to thereby permit movement of the of the movable portion and the mirror with respect to the stationary mount portion in response to electromagnetic interactions between the coil trace of the movable portion and an applied electromagnetic field.

11. The MEMS scanner assembly of claim 10, wherein the mirror is rigidly coupled to the movable portion through a mirror attachment structure that offsets the mirror from the scanning platform.

12. The MEMS scanner assembly of claim 10, wherein the coil trace of the movable portion circumscribes the stationary mount portion so that the stationary mount portion is located in a center of the coil trace.

13. The MEMS scanner assembly of claim 10, wherein the die carrier is mounted in proximity to at least one magnet, the at least one magnet configured to generate the applied electromagnetic field.

14. The MEMS scanner assembly of claim 10, wherein the stationary mount portion, the movable portion and the at least one flexure of the scanning platform are all formed on a common substrate using MEMS techniques, and wherein the mirror is formed separately from the scanning platform and attached to the scanning platform.

15. A scanning laser device, comprising:
 at least one source of laser light, the at least one source of laser light configured to generate a laser beam;
 a first scanning mirror configured to reflect the laser beam;
 a scanning platform comprising;
  a stationary mount portion located in a central portion of the scanning platform, the stationary mount rigidly coupled to a die carrier;
  a movable portion rigidly coupled to the first scanning mirror, the movable portion surrounding the stationary mount portion and having a coil trace formed thereon; and
  at least one flexure flexibly coupling the stationary mount portion to the movable portion to thereby permit movement of the movable portion and the first scanning mirror with respect to the stationary mount portion in response to electromagnetic interactions between the coil trace of the movable portion and an applied electromagnetic field; and
 a drive circuit configured to provide a signal to the coil trace to excite motion of the first scanning mirror in the applied electromagnetic field in order to reflect the laser beam in a pattern of scan lines.

16. The scanning laser device of claim 15, wherein the mirror is fixedly coupled to the movable portion via at least one mirror attachment structure.

17. The scanning laser device of claim 16, wherein the stationary mount portion, the movable portion and the at least one flexure of the scanning platform are all formed on a common substrate using microelectromechanical systems (MEMS) techniques, and wherein the mirror is formed separately from the scanning platform and attached to the scanning platform.

18. The scanning laser device of claim 15, wherein the coil trace of the movable portion circumscribes the stationary mount portion so that the stationary mount portion is located in a center of the coil trace.

19. The scanning laser device of claim 15, wherein the movable portion includes at least one opening proximate an intersection the at least one flexure and the movable portion to relieve stress between the stationary portion and the movable portion.

20. The scanning laser device of claim 15, wherein the at least one flexure comprises two flexures, wherein the two flexures are located on opposing sides of the stationary mount portion and extend outwardly from the stationary mount portion to the movable portion.

21. The scanning laser device of claim 15, wherein the movable portion includes a first side and a second side opposite the first side, and wherein the coil trace is formed on the first side of the movable portion and where the second side of the movable portion is configured to couple to the mirror.

22. The scanning laser device of claim 15, wherein the scanning platform has a width and a length, and wherein the mirror has a width and a length, and wherein at least one of the scanning platform width and scanning platform length is equal to or less than a corresponding one of the mirror width and the mirror length.

* * * * *